United States Patent
Blümel et al.

[11] Patent Number: 5,601,028
[45] Date of Patent: Feb. 11, 1997

[54] VEHICLE DRIVEN BY A LINEAR MOTOR

[75] Inventors: Gottfried Blümel, Odelzhausen; Wolfgang Schlögl, Gräpelfing; Frieder Scholz, Hausham; Karel Pechaty, Starnberg, all of Germany

[73] Assignee: Magnetbahn GmbH, Starnberg, Germany

[21] Appl. No.: 422,539

[22] Filed: Apr. 14, 1995

[30] Foreign Application Priority Data

Apr. 21, 1994 [DE] Germany .......................... 44 13 899.7

[51] Int. Cl.$^6$ ...................................................... B60L 13/10
[52] U.S. Cl. .......................... 104/282; 104/284; 104/293
[58] Field of Search .................................... 104/281, 282, 104/283, 284, 293, 246

[56] References Cited

U.S. PATENT DOCUMENTS

| | | | |
|---|---|---|---|
| 3,783,794 | 1/1974 | Gopfert et al. .......................... | 104/283 |
| 4,934,279 | 6/1990 | Azukizawa et al. .................. | 104/284 X |
| 5,291,834 | 3/1994 | Quaas ...................................... | 104/281 |
| 5,431,109 | 7/1995 | Berdut ..................................... | 104/283 |

FOREIGN PATENT DOCUMENTS

| | | | |
|---|---|---|---|
| 2137691 | 2/1974 | Germany . | |
| 2541599 | 3/1977 | Germany .............................. | 104/282 |
| 2933451 | 2/1981 | Germany . | |
| 3107341 | 9/1982 | Germany . | |
| 126108 | 5/1989 | Japan ..................................... | 104/284 |

*Primary Examiner*—S. Joseph Morano
*Attorney, Agent, or Firm*—Spencer & Frank

[57] ABSTRACT

A vehicle system for driving and supporting a vehicle by magnetic force along a vehicle travel path includes a guide rail extending along the vehicle travel path; longitudinal stators stationarily mounted along the guide rail; a vehicle including a vehicle shell and a vehicle chassis supporting the vehicle shell; a carrier bar secured to the chassis; permanent magnets mounted on the carrier bar for cooperating with the longitudinal stators to generate a magnetic carrying force opposing the vehicle weight; and first and second guide rollers each having a roller shaft rigidly supported relative to the carrier bar and rollingly engaging the guide rail for maintaining constant an airgap between the permanent magnets and the longitudinal stators. The first and second rollers take up, until their load limit is reached, any deficiency or excess in the magnetic carrying force to entirely compensate for the vehicle weight. The vehicle further carries electromagnets which generate supplemental magnetic forces to augment or to reduce the magnetic carrier force, as the case may be. The electromagnets are energized only when the load limit of the respective first or second guide rollers has been exceeded.

6 Claims, 2 Drawing Sheets

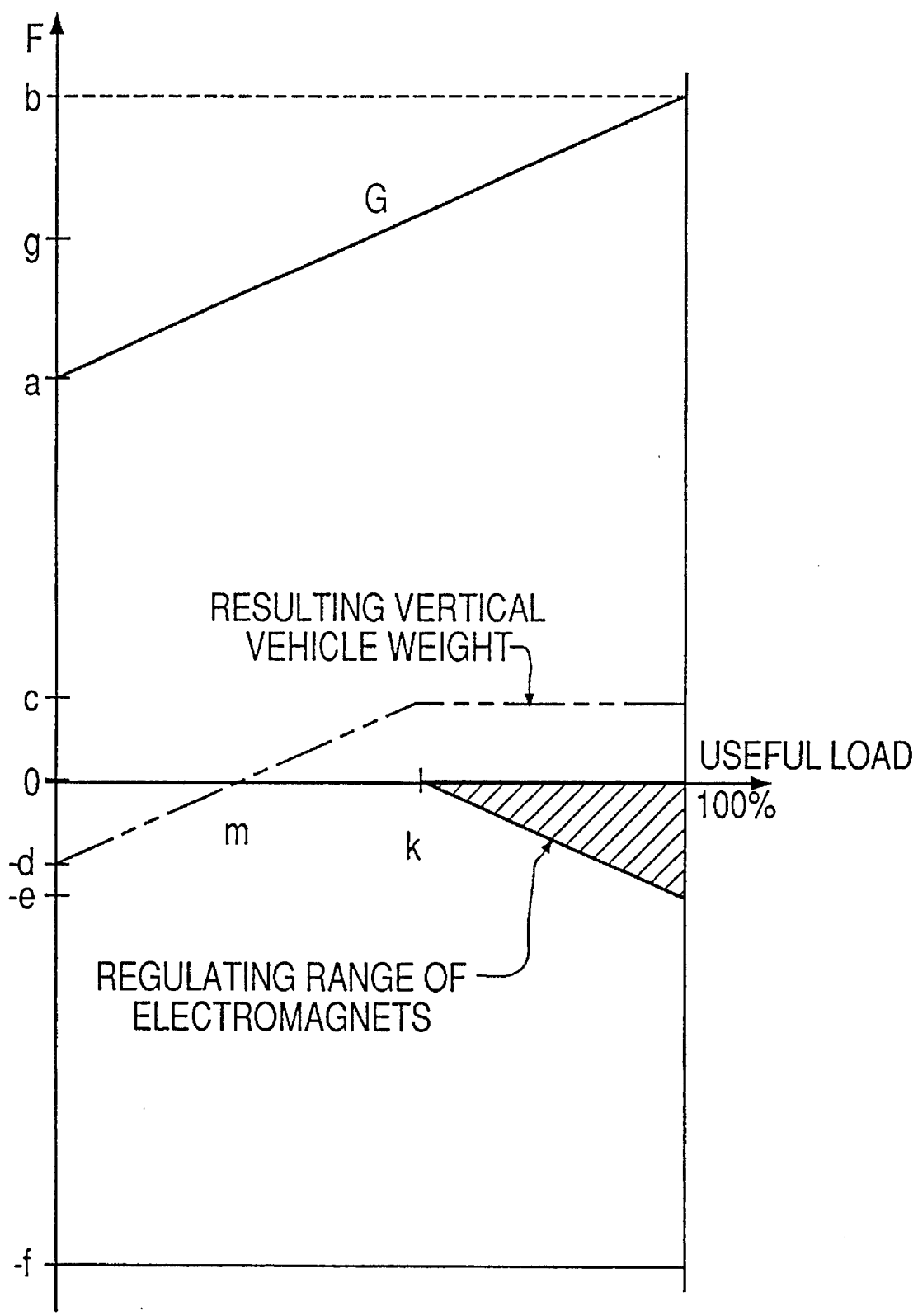

VEHICLE DRIVEN BY A LINEAR MOTOR

CROSS REFERENCE TO RELATED APPLICATION

This application claims the priority of German Application No. P 44 13 899.7 filed Apr. 21, 1994, which is incorporated herein by reference.

BACKGROUND OF THE INVENTION

This invention relates to a vehicle driven by a linear motor. The vehicle—also termed as magnetic levitation or "maglev" train—forms the armature of the linear motor and carries on its chassis permanent magnets which cooperate with longitudinal stators arranged along the travel path to generate magnetic travelling fields which drive and at least partially support the vehicle. The vehicle has upper and lower guide rollers for maintaining an air gap of a predetermined order of magnitude between the vehicle-mounted magnets and the longitudinal stators. Such a vehicle is disclosed, for example, in German Offenlegungsschrift (application published without examination) No. 31 07 341. For regulating the magnetic force to adapt it to various operational conditions, the air gap between the longitudinal stators on the one hand and the permanent magnets, on the other hand, is set mechanically by means of springs and levers. Position-defining devices are constituted by guide rollers. It is a disadvantage of this conventional mechanical air gap regulation that it has an appreciable hysteresis which in certain operational conditions may result in an overloading of the guide rollers. It is a further drawback that the assembly and the maintenance work of such a lever system are labor intensive and thus expensive.

Further, German Offenlegungsschrift 29 33 451 discloses the use of electromagnets and, in case of peak loads, the additional use of wheels with a lever system to maintain spacing and to support the vehicle load. It is a disadvantage of this arrangement that the electromagnets have a high electrical energy consumption and the assembly and maintenance work for the lever system of the additional wheels is complex.

SUMMARY OF THE INVENTION

It is an object of the invention to provide an improved vehicle of the above-outlined type in which the guide rollers cannot be overloaded, a complex lever system may be dispensed with and the energy consumption for the electromagnets remains low.

This object and others to become apparent as the specification progresses, are accomplished by the invention, according to which, briefly stated, the vehicle system for driving and supporting a vehicle by magnetic force along a vehicle travel path includes a guide rail extending along the vehicle travel path; longitudinal stators stationarily mounted along the guide rail; a vehicle including a vehicle shell and a vehicle chassis supporting the vehicle shell; a carrier bar secured to the chassis; permanent magnets mounted on the carrier bar for cooperating with the longitudinal stators to generate a magnetic carrying force opposing the vehicle weight; and first and second guide rollers each having a roller shaft rigidly supported relative to the carrier bar and rollingly engaging the guide rail for maintaining constant an airgap between the permanent magnets and the longitudinal stators. The first and second rollers take up, until their load limit is reached, any deficiency or excess in the magnetic carrying force to entirely compensate for the vehicle weight. The vehicle further carries electromagnets which generate supplemental magnetic forces to augment or to reduce the magnetic carrier force, as the case may be. The electromagnets are energized only when the load limit of the respective first or second guide rollers has been exceeded.

Thus, the vehicle according to the invention has—on both sides of the vehicle as viewed in the direction of forward travel—permanent magnets and electromagnets as well as guide rollers positioned above and below a guide rail extending along the travel path. The guide rollers are mounted on the carrier bar or at a fixed distance therefrom to maintain constant the clearance between the longitudinal stators arranged along the travel path and the magnets mounted on the carrier bar. The force of the permanent magnets and the weight of the vehicle are in equilibrium at a given vehicle weight. Upon increase or decrease of the load, the deficiency or excess in the magnetic force to obtain an equilibrium is taken up by the upper guide rollers or the lower guide rollers, respectively. Only when the load on the guide rollers has reached the load limit of the guide rollers are the forces which have to be additionally neutralized, compensated for by energizing the electromagnets.

According to a particularly advantageous feature of the invention, the permanent magnets are so arranged that in the most frequent operational condition the weight of the vehicle is just compensated for by the permanent magnets and in such a case no load is applied to the guide rollers and the electromagnets are in a deenergized state. It may be further of advantage to design the permanent magnets and the guide rollers such that if the vehicle is empty, the overcompensation of the attracting forces can be applied solely by the lower guide rollers and the electromagnets are energized only when the load on the vehicle has increased to such an extent that the upper guide rollers have reached their load limit.

BRIEF DESCRIPTION OF THE DRAWING

FIG. 2 is a diagram illustrating the forces to be applied by the individual components as a function of load.

DESCRIPTION OF THE PREFERRED EMBODIMENT

Figure 1:
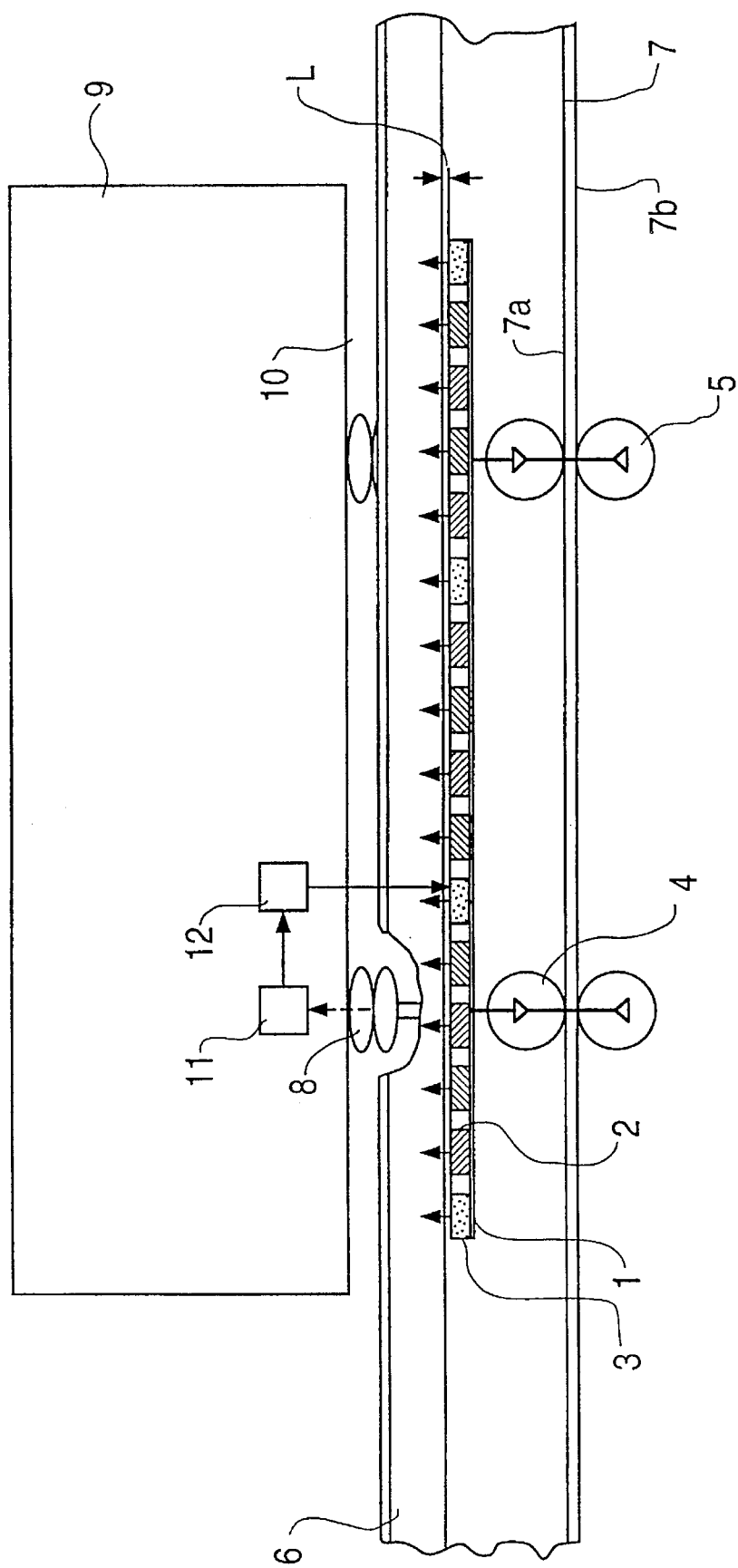
FIG. 1 is a schematic sectional elevational view of a preferred embodiment of the invention showing a vehicle positioned above a guide rail.

Turning to FIG. 1, the vehicle shown schematically therein has a vehicle shell 9, a chassis 10 carrying the shell 9 and also carrying, on each side of the vehicle, a magnet carrier bar 1 on which permanent magnets 2 and electromagnets 3 are mounted. The shafts of upper guide rollers 4 and lower guide rollers 5 mounted on the vehicle are rigidly coupled with the respective carrier bar 1. Such an arrangement results in a substantially constant air gap L between the permanent magnets 2 and the electromagnets 3 on the one hand and a longitudinal stator 6 arranged stationarily along the travel path of the vehicle. The guide rollers 4 and 5, as shown, may be situated underneath the carrier bar 1 or, to obtain a lower structural height, they may be arranged laterally thereto. The guide rollers 4 and 5 roll along the travel path of the vehicle on a top face 7a and a bottom face 7b, respectively, of a guide rail 7. The permanent magnets 2 are attracted upwardly by the longitudinal stator 6 and thus carry the vehicle shell 9 via the carrier bar 1 and an interposed spring assembly 8. The load condition of the vehicle, that is, a force which represents a deficiency or an excess in the magnetic forces to be in equilibrium with the momentary vehicle weight, is measured preferably by pressure or load sensors 11 at the spring assembly 8. As long as the load limit at the upper guide rollers 4 or the lower guide rollers 5 has not been exceeded, the electromagnets 3 remain in a deenergized state. only upon reaching the load limit are the electromagnets energized via a control circuit 12 conventional by itself. Upon exceeding the load limit of the lower guide rollers 5 the permanent magnets 2 are weakened in their effect by the electromagnets 3. Upon exceeding the load limit of the upper guide rollers 4 the permanent magnets 2 are reinforced in their effect by the electromagnets 3.

The individual vertical forces are illustrated in FIG. 2 wherein a is the weight of the empty vehicle;

b is the weight of the loaded vehicle;

g is the weight of the partially loaded vehicle at which the load limit of the upper guide rollers 4 has been reached;

c is the load limit of the sum of the upper guide rollers 4 of a vehicle;

−d is the load limit of the sum of the lower guide rollers 5 of the vehicle;

−e is the maximum value of the force of the electromagnets 3, opposing the weight of the vehicle;

−f is the force of the permanent magnets 2 which opposes the momentary weight of the vehicle;

m is the useful load in percentage at which the upper and lower guide rollers are free from load;

k is the useful load in percentage at which the load limit of the upper guide rollers 4 has been reached and when exceeded, the electromagnets 3 have to generate an additional force which opposes the weight of the vehicle; and G is the load curve of the vehicle for a useful load between 0 and 100%.

As long as the vehicle is empty and thus the weight of the vehicle G=a and thus the useful load is 0%, according to the given example, the permanent magnets overcompensate with the force −f the weight a of the empty vehicle by the value −d. This means that all the lower guide rollers 5 are pressed with a total force of d against the underface 7b of the guide rail 7. The more the weight G of the vehicle increases, the less the lower guide rollers 5 are loaded until at the value m the weight G of the vehicle equals the carrying force of the permanent magnets 2 and thus all guide rollers 4 and 5 are free from load. Upon further increasing the weight G of the vehicle, the upper guide rollers 4 are pressed against the upper face 7a of the guide rail 7 until their load limit k is reached. If this value is exceeded, the electromagnets 3 are energized in order to reinforce the permanent magnets 2 in their carrying force and the resulting vertical force which has to be absorbed by the upper guide rollers 4 have to be maintained at the load limit c of the sum of the upper guide rollers 4 of the vehicle. To take into account the relatively rarely occurring empty run of the vehicle, it is advantageous to so select the carrying force of the permanent magnets 2 and the load limit of the guide rollers 4 and 5 that at empty runs (or substantially empty runs) the carrying force of the permanent magnets 2 is weakened by the electromagnets 3. It is furthermore advantageous to design the carrying force of the permanent magnets 2 in such a manner that the carrying force of the permanent magnets 2 corresponds to the vehicle weight G in the most frequently encountered operational condition and in such a case the guide rollers 4 and 5 are free from load which extends their service life. It will be understood that it is also feasible to select the carrying force and thus the load limit at different values for the upper and lower guide rollers, respectively.

The arrangement according to the invention may be modified in a simple manner. Thus, an equivalent embodiment may be obtained in that instead of a single guide rail 7, an upper and a lower guide rail is utilized, in which case the function of the upper guide rollers 4 is assumed by the rollers engaging the lower guide rail and the function of the lower guide rollers 5 is assumed by the rollers engaging the underside of the upper guide rail.

It will be understood that the above description of the present invention is susceptible to various modifications, changes and adaptations, and the same are intended to be comprehended within the meaning and range of equivalents of the appended claims.

What is claimed is:

1. A vehicle system for driving and supporting a vehicle by magnetic force along a vehicle travel path, comprising (a) a guide rail extending along the vehicle travel path;

(b) longitudinal stators stationarily mounted along said guide rail;

(c) a vehicle including a vehicle shell and a vehicle chassis supporting the vehicle shell; the vehicle having a weight essentially composed of the weight of said shell, said chassis and a useful load;

(d) a carrier bar secured to said chassis and extending generally parallel to said guide rail;

(e) permanent magnets mounted on said carrier bar for cooperating with said longitudinal stators to generate a magnetic carrying force opposing the vehicle weight;

(f) first and second guide rollers each having a roller shaft rigidly supported relative to said carrier bar and rollingly engaging said guide rail for maintaining constant an airgap between said permanent magnets and said longitudinal stators; said first rollers taking up and transmitting to said guide rail any downwardly-directed forces representing a first difference between the vehicle weight and the magnetic carrying force and not exceeding a first load limit of said first guide rollers; said second rollers taking up and transmitting to said guide rail any upwardly-directed forces representing a second difference between the magnetic carrying force and the vehicle weight and not exceeding a second load limit of said second guide rollers; said first difference constituting a deficiency in said magnetic carrying force to entirely compensate for the vehicle weight and said second difference constituting an excess in said magnetic carrying force to entirely compensate for the vehicle weight;

(g) electromagnets carried by said vehicle; said electromagnets having an energized and a de-energized state; in said energized state said electromagnets generating an electromagnetic force compensating for loads on either of said first and second rollers; and (h) means for placing said electromagnets into said energized state when either of said first or second load limit is exceeded.

2. The vehicle system as defined in claim 1, wherein said means for energizing said electromagnets comprises a weight measuring means for sensing the vehicle weight and for emitting signals representing the vehicle weight and control means connected to said weight measuring means and said electromagnets for placing said electromagnets into said energized state as a function of the vehicle weight.

3. The vehicle system as defined in claim 1, wherein the force generated by said electromagnets and the load limit of said first and second guide rollers is so selected that for an empty or partially loaded vehicle the deficiency or excess in said magnetic carrying force is taken up solely by said first and second guide rollers, respectively.

4. The vehicle system as defined in claim 1, wherein the force generated by said electromagnets corresponds to the vehicle weight for a most frequently occurring operational condition of the vehicle.

5. The vehicle system as defined in claim 1, wherein said first and second guide rollers are rigidly secured to said carrier bar.

6. The vehicle system as defined in claim 1, wherein said electromagnets are mounted on said carrier bar.

* * * * *